(12) United States Patent \
Yamada

(10) Patent No.: US 12,668,229 B2 \
(45) Date of Patent: Jun. 30, 2026

(54) HYBRID ELECTRIC VEHICLE AND CONTROL METHOD OF THE SAME

(71) Applicant: TOYOTA JIDOSHA KABUSHIKI KAISHA, Toyota (JP)

(72) Inventor: Yuki Yamada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 52 days.

(21) Appl. No.: 18/814,590

(22) Filed: Aug. 26, 2024

(65) Prior Publication Data

US 2025/0178585 A1    Jun. 5, 2025

(30) Foreign Application Priority Data

Dec. 5, 2023    (JP) ................................. 2023-205547

(51) Int. Cl.
| | |
|---|---|
| *B60W 20/12* | (2016.01) |
| *B60W 10/06* | (2006.01) |
| *B60W 10/08* | (2006.01) |
| *B60W 20/13* | (2016.01) |

(52) U.S. Cl.
CPC ............ *B60W 20/12* (2016.01); *B60W 10/06* (2013.01); *B60W 10/08* (2013.01); *B60W 20/13* (2016.01); *B60W 2555/80* (2020.02); *B60W 2710/244* (2013.01)

(58) Field of Classification Search
CPC ...... B60W 20/12; B60W 10/06; B60W 10/08; B60W 20/13; B60W 2555/80; B60W 2710/244; B60W 50/0097; B60W 2510/244; B60W 2556/50; B60W 10/26; B60W 20/10; B60W 20/15; B60W 20/40; Y02T 10/62
See application file for complete search history.

(56) References Cited

FOREIGN PATENT DOCUMENTS

| | | |
|---|---|---|
| JP | H06-187595 A | 7/1994 |
| JP | 3169100 B2 | 5/2001 |
| JP | 2002359904 A * | 12/2002 |

* cited by examiner

*Primary Examiner* — Brian P Sweeney \
(74) *Attorney, Agent, or Firm* — SoraIP, Inc.

(57) ABSTRACT

Execution of control for first spot region of performing traveling by controlling an engine and a motor such that the electricity storage ratio of an electricity storage apparatus becomes smaller before a first spot region presumed or set as a spot or a region preferred to be reached in a state in which the electricity storage ratio of the electricity storage apparatus is small is prohibited when execution of control for second spot region of traveling by only a motive power from the motor by stopping the engine is presumed or planned within a predetermined distance range in a second spot region presumed or set as a spot or a region in which electrically-powered traveling of traveling by only the motive power from the motor by stopping the engine is set.

4 Claims, 4 Drawing Sheets

HYBRID ELECTRIC VEHICLE AND CONTROL METHOD OF THE SAME

CROSS-REFERENCE TO RELATED APPLICATION

This application claims priority to Japanese Patent Application No. 2023-205547 filed on Dec. 5, 2023, incorporated herein by reference in its entirety.

BACKGROUND

1. Technical Field

The present disclosure relates to a hybrid electric vehicle and a control method of the same.

2. Description of Related Art

Hitherto, as a hybrid electric vehicle of this type, a hybrid electric vehicle that switches between each of modes, that is, an electric motor mode that travels by an electric motor alone, an engine mode that travels by an engine alone, and a combined mode using both in accordance with a mode switching vehicle speed has been proposed (for example, see Japanese Unexamined Patent Application Publication No. 06-187595). The hybrid electric vehicle enables traveling adapted to the environment by switching the mode switching vehicle speed for each of various environments such as an urban area, suburbs, a highway, and a tunnel.

SUMMARY

In a hybrid electric vehicle, when a system is activated after being stopped for a long period of time, it is preferred that warm-up operation be performed while a battery is charged in order to improve the energy efficiency at the time of activation. Therefore, first control of decreasing the electricity storage ratio of the battery before a spot or a region in which stopping for a long period of time is predicted may be performed. When an electrically-powered traveling region in which the engine is to be stopped and traveling is to be performed by only a motive power from a motor is set by an autonomous body, a user, and the like, second control of increasing the electricity storage ratio of the battery before the electrically-powered traveling region may be performed. When the first control and the second control as above interfere with each other, it becomes a problem regarding which control is to be prioritized.

A main object of a hybrid electric vehicle and a control method thereof of the present disclosure is to avoid interference between control of decreasing an electricity storage ratio of an electricity storage apparatus in advance and control of increasing the electricity storage ratio of the electricity storage apparatus in advance.

The hybrid electric vehicle and the control method thereof of the present disclosure have taken following measures in order to achieve the main object described above.

A hybrid electric vehicle of the present disclosure includes: an engine configured to output a motive power for traveling; a motor configured to output a motive power for traveling; an electricity storage apparatus configured to exchange electricity with the motor; and a controller that executes control for first spot region of performing traveling by controlling the engine and the motor such that an electricity storage ratio of the electricity storage apparatus becomes smaller before a first spot region presumed or set as a spot or a region that is preferred to be reached in a state in which the electricity storage ratio of the electricity storage apparatus is small, and control for second spot region of performing traveling by only the motive power from the motor by stopping the engine in a second spot region presumed or set as a spot or a region in which electrically-powered traveling of traveling by only the motive power from the motor by stopping the engine is set. In the hybrid electric vehicle, the controller prohibits execution of the control for first spot region when execution of the control for second spot region is presumed or planned within a predetermined distance range.

In the hybrid electric vehicle of the present disclosure, when the control for first spot region of performing traveling by controlling the engine and the motor such that the electricity storage ratio of the electricity storage apparatus becomes smaller before the first spot region presumed or set as the spot or the region that is preferred to be reached in a state in which the electricity storage ratio of the electricity storage apparatus is small is executed or the control for second spot region of performing traveling by only the motive power from the motor by stopping the engine in the second spot region presumed or set as the spot or the region in which the electrically-powered traveling of traveling by only the motive power from the motor by stopping the engine is set is executed, the following is performed. Specifically, the controller prohibits the execution of the control for first spot region when the execution of the control for second spot region is presumed or planned within the predetermined distance range. As a result, the interference between the control for first spot region and the control for second spot region can be avoided. Here, the expression of "presumed" includes a case based on a history of the past and a case based on prediction, the expression of "set" includes a case of being set in advance and a case of being set by a user, and the expression of "planned" includes a case of being planned as a traveling route to a destination by a navigation system.

In the hybrid electric vehicle of the present disclosure, the first spot region may be a spot or a region in which stopping for a long period of time is predicted. Here, as "a long period of time", a period of time equal to or more than an extent to which the engine or an exhaust emission control device mounted on an exhaust system of the engine is cooled to a point at which the engine or the exhaust emission control device needs to be warmed up can be assumed.

In the hybrid electric vehicle of the present disclosure, the control for second spot region may further perform traveling by controlling the engine and the motor such that the electricity storage ratio of the electricity storage apparatus becomes greater before the second spot region. As a result, the second spot region can be traveled by only the motive power from the motor by stopping the engine in a more reliable manner.

A control method of a hybrid electric vehicle of the present disclosure is a control method of a hybrid electric vehicle including: an engine configured to output a motive power for traveling; a motor configured to output a motive power for traveling; and an electricity storage apparatus configured to exchange electricity with the motor. The control method includes: enabling control for first spot region of performing traveling by controlling the engine and the motor such that an electricity storage ratio of the electricity storage apparatus becomes smaller before a first spot region presumed or set as a spot or a region that is preferred to be reached in a state in which the electricity storage ratio of the electricity storage apparatus is small, and control for second spot region of performing traveling by only the motive power from the motor by stopping the engine in a second spot region presumed or set as a spot or a region in which electrically-powered traveling of traveling by only the motive power from the motor by stopping the engine is set; and prohibiting the control for first spot region when execution of the control for second spot region is presumed or planned within a predetermined distance range.

In the control method of a hybrid electric vehicle of the present disclosure, when the control for first spot region of performing traveling by controlling the engine and the motor such that the electricity storage ratio of the electricity storage apparatus becomes smaller before the first spot region presumed or set as the spot or the region that is preferred to be reached in a state in which the electricity storage ratio of the electricity storage apparatus is small is executed or the control for second spot region of performing traveling by only the motive power from the motor by stopping the engine in the second spot region presumed or set as the spot or the region in which the electrically-powered traveling of traveling by only the motive power from the motor by stopping the engine is set is executed, the following is performed. Specifically, the execution of the control for first spot region is prohibited when the execution of the control for second spot region is presumed or planned within the predetermined distance range. As a result, the interference between the control for first spot region and the control for second spot region can be avoided. In the control method of the hybrid electric vehicle, as described above, the expression of "presumed" includes a case based on a history of the past and a case based on prediction, the expression of "set" includes a case of being set in advance and a case of being set by the user, and the expression of "planned" includes a case of being planned as a traveling route to a destination by the navigation system as well.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
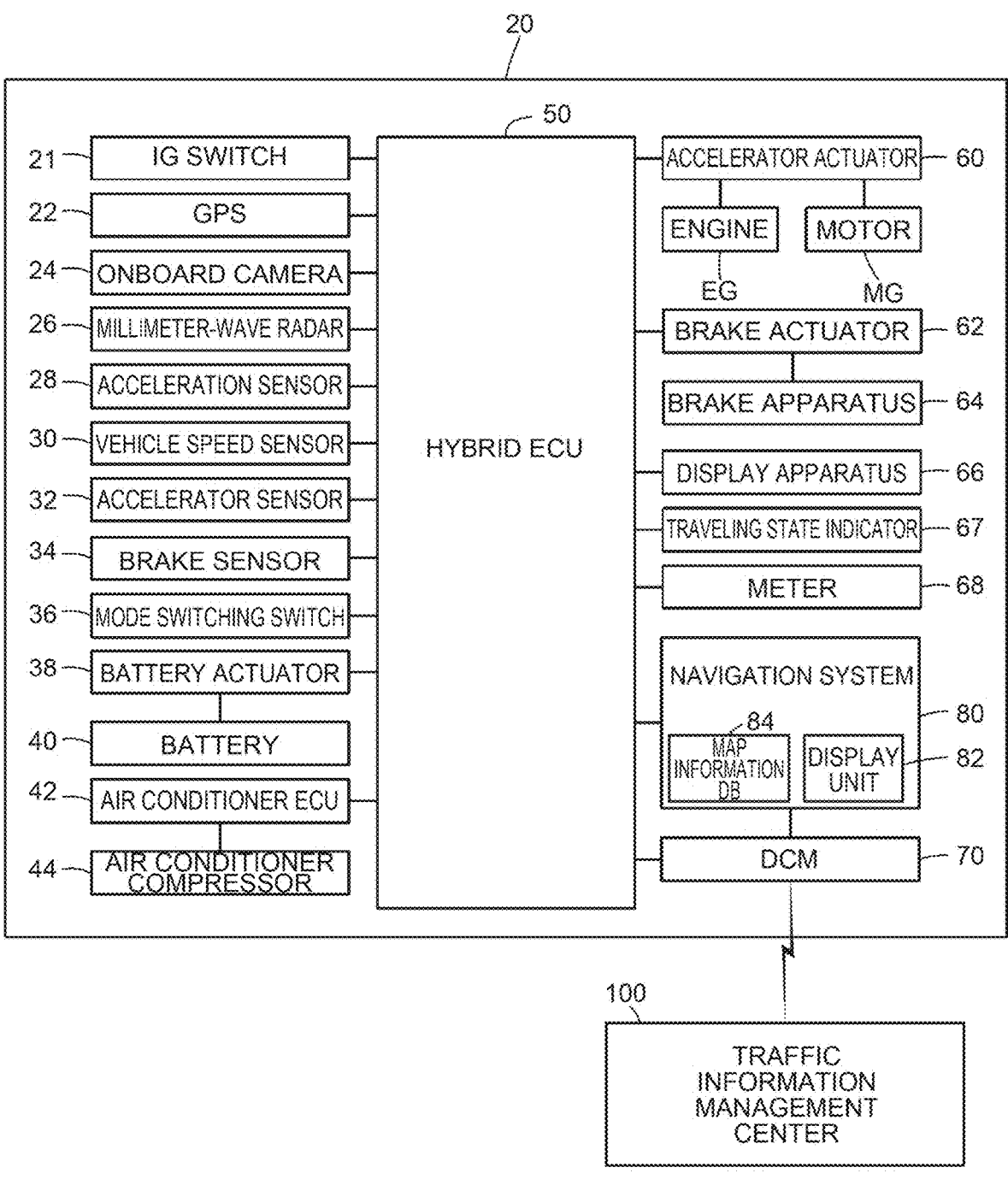
FIG. 1 is a block diagram showing one example of a hybrid electric automobile 20 as one embodiment of the present disclosure as blocks centering around a hybrid ECU 50.

Next, a form (embodiment) for carrying out the present disclosure is described. FIG. 1 is a block diagram showing one example of a hybrid electric automobile 20 as one embodiment of the present disclosure as blocks centering around a hybrid electronic control unit (hereinafter referred to as a hybrid ECU) 50. As shown in the drawing, the hybrid electric automobile 20 of the embodiment includes an engine EG and a motor MG as motive power sources. The hybrid electric automobile 20 of the embodiment has a motor traveling mode that travels by a motive power from the motor MG in a state in which the operation of the engine EG is stopped, and a normal traveling mode that travels by a motive power from the engine EG and the motive power from the motor MG by operating the engine EG as needed as traveling modes.

The hybrid electric automobile 20 of the embodiment includes an ignition switch 21, a global positioning system (GPS, global positioning satellite) 22, an onboard camera 24, a millimeter-wave radar 26, an acceleration sensor 28, a vehicle speed sensor 30, an accelerator sensor 32, a brake sensor 34, a mode switching switch 36, a battery actuator 38, a battery 40, an air conditioner electronic control unit (hereinafter referred to as an air conditioner ECU) 42, an air conditioner compressor 44, a hybrid ECU 50, an accelerator actuator 60, a brake actuator 62, a brake apparatus 64, a display apparatus 66, a traveling state indicator 67, a meter 68, a data communication module (DCM) 70, a navigation system 80, and the like besides the motive power sources.

The GPS 22 is an apparatus that detects the location of a vehicle on the basis of signals transmitted from a plurality of GPS satellites. The onboard camera 24 is a camera that images the periphery of the vehicle, and a front camera that images a place ahead of the vehicle, a rear camera that images a place behind the vehicle, and the like correspond thereto, for example. The millimeter-wave radar 26 detects the inter-vehicular distance or the relative speed between an own vehicle and a vehicle ahead and detects the inter-vehicular distance and the relative speed between the own vehicle and a vehicle behind.

The acceleration sensor 28 is a sensor that detects the acceleration of the vehicle in the front-rear direction and detects the acceleration of the vehicle in the left-right direction (lateral direction), for example. The vehicle speed sensor 30 detects the vehicle speed of the vehicle on the basis of the wheel speed and the like. The accelerator sensor 32 detects an accelerator operation amount and the like in accordance with the depression amount of an accelerator pedal by a driver. The brake sensor 34 detects the brake position as the depression amount of a brake pedal by the driver and the like. The mode switching switch 36 is disposed in the vicinity of a steering wheel in a driving seat and is a switch for performing switching between the motor traveling mode and the normal traveling mode.

The battery actuator 38 detects the state of the battery 40, for example, voltage across terminals, charge and discharge current, and battery temperature and manages the battery 40 on the basis of the above. The battery actuator 38 calculates the electricity storage ratio SOC as a ratio of the remaining electricity storage capacity to the entire electricity storage capacity on the basis of the charge and discharge current and calculates a maximum permissible output electricity (output limit Wout) that may be output from the battery 40 and a maximum permissible input electricity (input limit Win) that may be input to the battery 40 on the basis of the electricity storage ratio SOC, the battery temperature, and the like. The battery 40 is configured as a chargeable and dischargeable secondary battery, and a lithium ion battery, a nickel hydride battery, and a lead storage battery, for example, can be used.

The air conditioner ECU 42 is configured as a microcomputer centering around a CPU (not shown) and includes a ROM, a RAM, a flash memory, an input port, an output port, a communication port, and the like besides the CPU. The air conditioner ECU 42 is integrated in an air conditioning apparatus that performs air conditioning of a passenger compartment and controls the driving of the air conditioner compressor 44 in the air conditioning apparatus such that the temperature of the passenger compartment reaches a set temperature.

The engine EG is configured as an internal combustion engine, for example. The motor MG is configured as an electric motor that also functions as an electricity generator such as a synchronous activation electric motor, for example. The motor MG is connected to the battery 40 via an inverter (not shown) and can output a driving force with use of electricity supplied from the battery 40 and charge the battery 40 by generated electricity.

The hybrid ECU 50 is configured as a microcomputer centering around a CPU (not shown) and includes a ROM, a RAM, a flash memory, an input port, an output port, a communication port, and the like besides the CPU. The hybrid ECU 50 sets the traveling mode and sets a target operation point (a target rotational speed and a target torque) of the engine EG and a torque command of the motor MG on the basis of the set traveling mode, the accelerator operation amount from the accelerator sensor 32, the brake position from the brake sensor 34, and an output limit and an input limit from the battery actuator 38. The hybrid ECU 50 is not activated by accessory ON and is activated by ready ON.

When motor traveling is performed, the hybrid ECU 50 sets a requested driving force and a requested power on the basis of the accelerator operation amount from the accelerator sensor 32 and the vehicle speed from the vehicle speed sensor 30, sets a torque command of the motor MG so as to output the requested driving force and the requested power to the vehicle, and transmits the set torque command to the accelerator actuator 60. When hybrid traveling is performed, the hybrid ECU 50 sets a target operation point of the engine EG and a torque command of the motor MG so as to output the requested driving force and the requested power to the vehicle and transmits the target operation point and the torque command to the accelerator actuator 60. When the brake pedal is depressed, the hybrid ECU 50 sets a requested braking force on the basis of the brake position from the brake sensor 34 and the vehicle speed from the vehicle speed sensor 30, sets a regeneration torque command for performing regeneration control of the motor MG on the basis of the requested braking force and the vehicle speed, sets a target braking force by the brake apparatus, transmits the torque command to the accelerator actuator 60, and transmits the target braking force to the brake actuator 62.

The accelerator actuator 60 performs drive control of the engine EG and the motor MG by the target operation point and the torque command set by the hybrid ECU 50. The accelerator actuator 60 performs intake air volume control, fuel injection control, ignition control, intake valve opening-closing timing control, and the like such that the engine EG is operated at the target operation point (the target rotational speed and the target torque). The accelerator actuator 60 performs switching control of a switching element included in an inverter for driving the motor MG such that a torque equivalent to the torque command is output from the motor MG.

The brake actuator 62 controls the brake apparatus 64 such that the target braking force set by the hybrid ECU 50 acts on the vehicle by the brake apparatus 64. The brake apparatus 64 is configured as a hydraulically-driven friction brake, for example.

The display apparatus 66 is integrated in an installment panel on the front side of the driving seat, for example, and displays various information and also functions as a touch screen. The traveling state indicator 67 has an EV indicator and an HV indicator (not shown). The EV indicator is lit up and the HV indicator is turned off when motor traveling is performed, and the EV indicator is turned off and the HV indicator is lit up when hybrid traveling is performed. The meter 68 is integrated in the installment panel on the front side of the driving seat, for example.

The data communication module (DCM) 70 transmits information on the own vehicle to a traffic information management center 100 and receives road traffic information from the traffic information management center 100. Examples of the information on the own vehicle include the location, the vehicle speed, the traveling power, the traveling mode, and the like of the own vehicle. Examples of the road traffic information include information relating to current and future traffic jams, information relating to prediction values of the future average vehicle speed and the current average vehicle speed in a section on a traveling route, information relating to a traffic regulation, information relating to weather, information relating to a road surface state, information relating to a map, and the like. The DCM 70 communicates with the traffic information management center 100 at a predetermined interval (for example, every 30 seconds, every minute, and every two minutes).

The navigation system 80 is a system that guides the own vehicle to a set destination and includes a display unit 82 and a map information database 84. The display unit 82 is a functional block having a function that displays a route to the destination, an own car location, and the like on the display apparatus 66 on the basis of map information. The navigation system 80 communicates with the traffic information management center 100 via the data communication module (DCM) 70. When a destination and a transit point are set, the navigation system 80 sets a route on the basis of information on the destination and the transit point, information on a current location (the current location of the own vehicle) acquired by the GPS 22, and information stored in the map information database 84. The navigation system 80 acquires road traffic information by communicating with the traffic information management center 100 every predetermined period of time (for example, every three minutes and every five minutes) and performs route guidance on the basis of the road traffic information. The map information stored in the map information database 84 does not only include data as a map but also includes the road gradient, the type of the road, the elevation, and the like for each traveling section.

When the navigation system 80 performs route guidance, the navigation system 80 generates load information necessary for traveling in each traveling section and the like as anticipatory information on the basis of information relating to a traveling load and information on each traveling section in the traveling route out of the road traffic information acquired from the traffic information management center 100, the vehicle speed of the own vehicle, the traveling power of the own vehicle, the traveling mode of the own vehicle, and the like and transmits the anticipatory information to the hybrid ECU 50 each time the road traffic information is acquired from the traffic information management center 100 (or every predetermined period of time). The anticipatory information includes information on the own vehicle such as the location, the vehicle speed, the traveling power, the traveling mode, of the own vehicle, information relating to current and future traffic jams, information relating to prediction values of the future average vehicle speed and the current average vehicle speed in a section on the traveling route, information relating to traffic regulation, information relating to weather, information relating to a road surface state, information relating to a map, and the like. The information relating to a map also includes a region (motor traveling region) in which motor traveling is to be performed defined by a municipality and the like, for example. The navigation system 80 can also set a motor traveling region by specifying regions such as a region in the vicinity of home in accordance with user operation. The navigation system 80 stores a spot at which stopping is performed for a long period of time equal to or more than an extent to which an exhaust emission control device mounted on an exhaust system of the engine EG needs to be warmed up when the system is activated next time into the map information as a long-time-period vehicle stopping place. The navigation system 80 transmits a signal indicating whether a region is a motor traveling region to the hybrid ECU 50 when the own vehicle travels.

Figure 2:
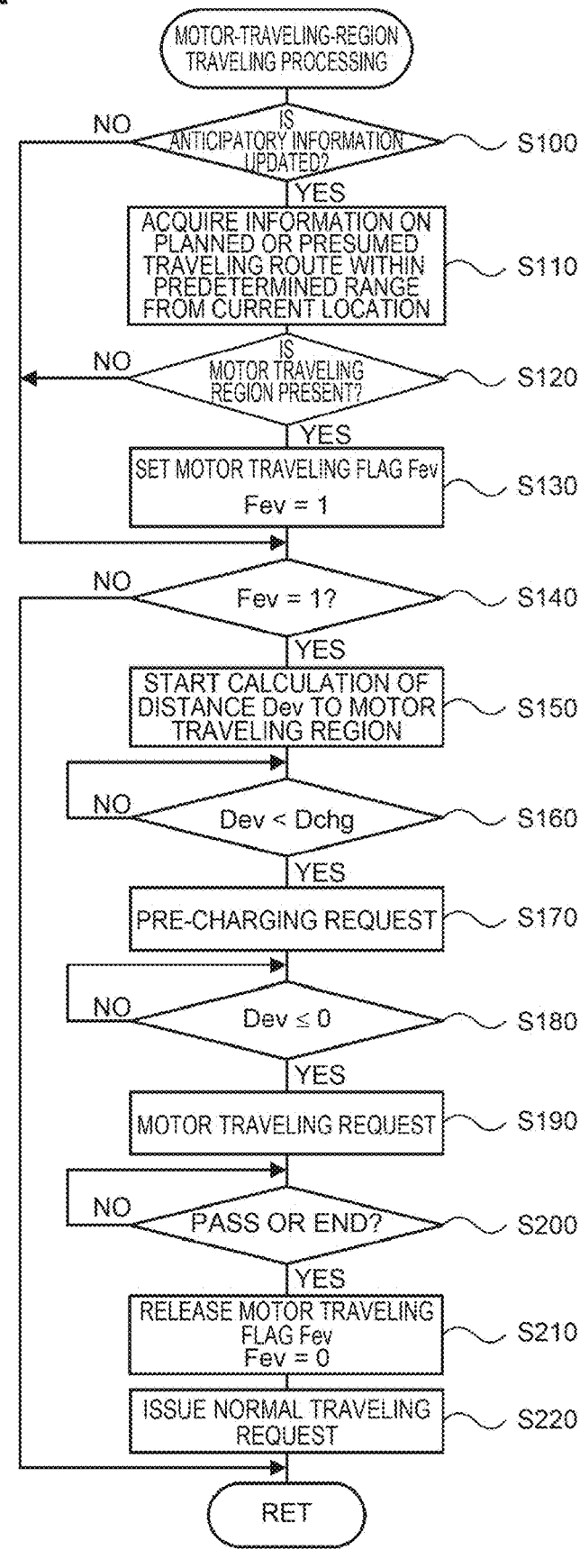
FIG. 2 is a flowchart showing one example of motor-traveling-region traveling processing executed by the hybrid ECU 50.
Figure 3:
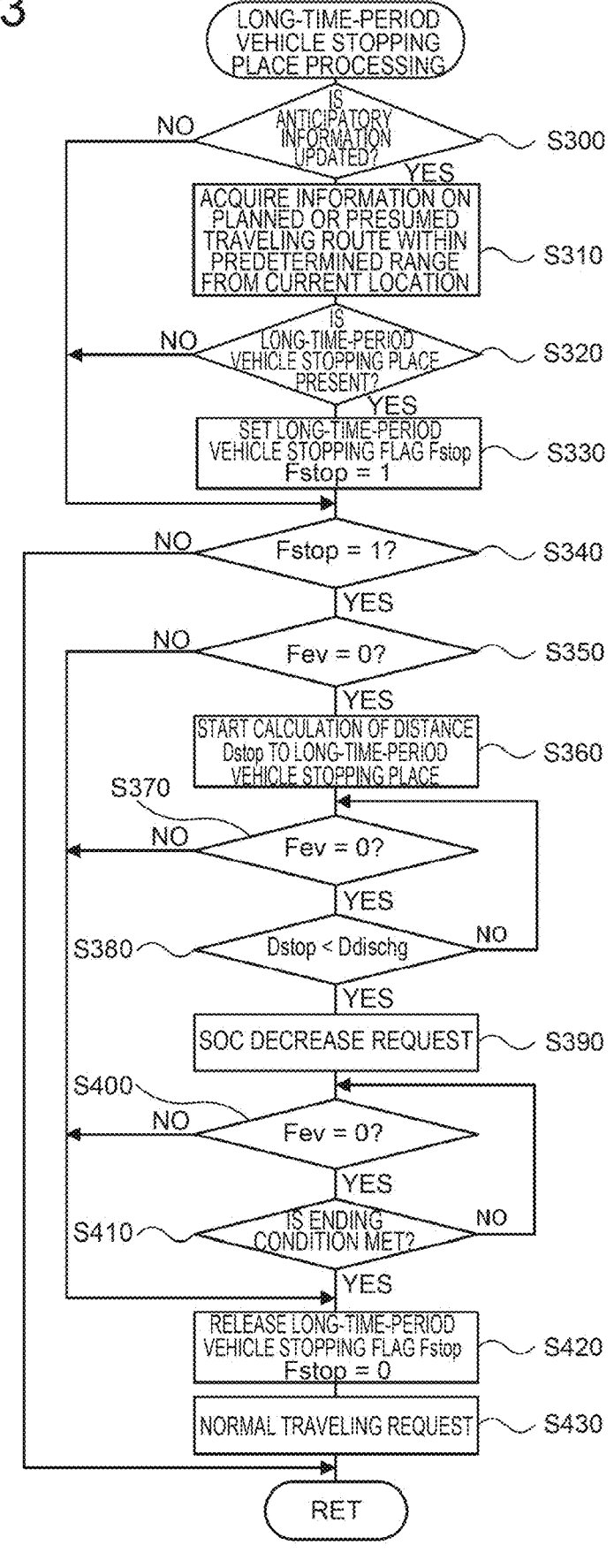
FIG. 3 is a flowchart showing one example of long-time-period vehicle stopping place processing executed by the hybrid ECU 50.

Next, operation in the hybrid electric automobile 20 configured as above, in particular, operation in motor-traveling-region traveling processing executed when the motor traveling region is traveled and long-time-period vehicle stopping processing executed when the vehicle is predicted to be stopped at the long-time-period vehicle stopping place is described. Here, the motor-traveling-region traveling processing includes processing of causing the electricity storage ratio SOC of the battery 40 to be higher before the set motor traveling region and enables motor traveling in the motor traveling region by this processing. The long-time-period vehicle stopping processing includes processing of decreasing the electricity storage ratio SOC of the battery 40 before the long-time-period vehicle stopping place. By this processing, the long-time-period vehicle stopping processing immediately starts the engine EG when the system is activated after the vehicle is stopped and causes the load on the engine EG to be greater when the exhaust emission control device mounted on the exhaust system is warmed up, to thereby cause the warm-up to be completed early on and improve the charging efficiency. FIG. 2 is a flowchart showing one example of motor-traveling-region traveling processing executed by the hybrid ECU 50, and FIG. 3 is a flowchart showing one example of long-time-period vehicle stopping place processing executed by the hybrid ECU 50. Those processing are repeatedly executed. Description is made in order below.

When the motor-traveling-region traveling processing is executed, the hybrid ECU 50 first determines whether the anticipatory information is updated (Step S100). When it is determined that the anticipatory information is updated, information on a planned or presumed traveling route within a predetermined range from a current location is acquired (Step S110). As the predetermined range, 5 km, 10 km, 15 km, and the like can be used. The planned traveling route is a traveling route planned as a route guidance from the current location to a destination by the navigation system 80 as a result of the destination being set, and the presumed traveling route is a traveling route by which traveling is presumed from the current location. The information to be acquired includes the presence of a motor traveling region, a starting spot and an ending spot of the motor traveling region when the motor traveling region is present, a spot at which a charging request before the motor traveling region is issued, the long-time-period vehicle stopping place, and the like besides the anticipatory information described above. Next, it is determined whether a motor traveling region is present on the planned or presumed traveling route within a predetermined range (Step S120). When it is determined that a motor traveling region is present, a motor traveling flag Fev is set to a value of 1 (Step S130), and the processing proceeds to Step S140.

When it is determined that the anticipatory information is not updated in Step S100, the processing proceeds to Step S140 in a state in which the motor traveling flag Fev is unchanged and maintained. When it is determined that a motor traveling region is not present on the planned or presumed traveling route within a predetermined range in Step S120 even when it is determined that the anticipatory information is updated in Step S100, the processing proceeds to Step S140 without setting the motor traveling flag Fev to a value of 1.

Next, it is determined whether the motor traveling flag Fev is a value of 1 (Step S140). When it is determined that the motor traveling flag Fev is a value of 0, it is determined that a motor traveling region is not present on the planned or presumed traveling route within a predetermined range from the current location, and the present processing is ended.

When it is determined that the motor traveling flag Fev is a value of 1 in Step S140, the calculation of a distance Dev to the starting spot of the motor traveling region is started (Step S150). Then, it is waited until the distance Dev to the starting spot of the motor traveling region reaches a distance less than a distance Dchg to a charging starting spot before the starting spot of the motor traveling region (Step S160), and then a pre-charging request is issued in order to increase the electricity storage ratio SOC of the battery 40 (Step S170). Here, the charging starting spot is defined as a spot before the starting spot of the motor traveling region by a predetermined distance (for example, 1 km or 2 km), and Step S160 is a determination regarding whether the distance Dev has reached a distance less than a predetermined distance. When a pre-charging request is issued, the hybrid ECU 50 generates electricity by the motor MG with use of the motive power acquired by driving the engine EG, and the battery 40 is charged by the generated electricity.

Next, it is waited until the distance Dev to the starting spot of the motor traveling region becomes a value of 0 or less (Step S180), and then a motor traveling request is issued (Step S190). When a motor traveling request is issued, the hybrid ECU 50 sets the motor traveling mode to the traveling mode and performs control such that traveling is performed by motor traveling of traveling by only the motive power from the motor MG in a state in which the engine EG is stopped.

Then, it is waited until the motor traveling region is passed through or an ending condition of the control is met (Step S200). Then, the motor traveling flag Fev is reset to a value of 0 (Step S210), a normal traveling request is issued (Step S220), and the present processing is ended. The ending condition of the control includes the time when the system is stopped (IG OFF is performed). When a normal traveling request is issued, the hybrid ECU 50 performs control such that traveling is performed by causing the traveling mode to be the normal traveling mode.

When the long-time-period vehicle stopping place processing is executed, the hybrid ECU 50 first determines whether the anticipatory information is updated (Step S300). When it is determined that the anticipatory information is updated, information on a planned or presumed traveling route within a predetermined range from the current location is acquired (Step S310). The predetermined range, the planned traveling route, the presumed traveling route, and the information to be acquired are described above. Next, it is determined whether a long-time-period vehicle stopping place is present on the planned or presumed traveling route within a predetermined range (Step S320). When it is determined that the long-time-period vehicle stopping place is present, a long-time-period vehicle stopping flag Fstop is set to a value of 1 (Step S330), and the processing proceeds to Step S340.

When it is determined that the anticipatory information is not updated in Step S300, the processing proceeds to Step S340 in a state in which the long-time-period vehicle stopping flag Fstop is unchanged and maintained. Even when it is determined that the anticipatory information is updated in Step S300, the processing proceeds to Step S340 without setting the long-time-period vehicle stopping flag Fstop to a value of 1 when it is determined that a long-time-period vehicle stopping place is not present on the planned or presumed traveling route within a predetermined range in Step S320.

Next, it is determined whether the long-time-period vehicle stopping flag Fstop is a value of 1 (Step S340). When it is determined that the long-time-period vehicle stopping flag Fstop is a value of 0, it is determined that a long-time-period vehicle stopping place is not present on the planned or predicted traveling route within a predetermined range from the current location, and the present processing is ended.

When it is determined that the long-time-period vehicle stopping flag Fstop is a value of 1 in Step S340, it is determined whether the motor traveling flag Fev is a value of 0 (Step S350). When it is determined that the motor traveling flag Fev is a value of 0, the calculation of a distance Dstop to the long-time-period vehicle stopping place is started (Step S360). Then, it is waited until the distance Dev to the long-time-period vehicle stopping place in a state in which the motor traveling flag Fev is a value of 0 reaches a distance less than a distance Ddischg to a discharging starting spot (Steps S370, S380), and then a SOC decrease request is issued in order to decrease the electricity storage ratio SOC of the battery 40 (Step S390). When a SOC decrease request is issued, the hybrid ECU 50 performs control so as to gradually decrease the electricity storage ratio SOC of the battery 40.

Next, it is waited until an ending condition is met in a state in which the motor traveling flag Fev is a value of 0 (Steps S400, S410). Then, the long-time-period vehicle stopping flag Fstop is reset to a value of 0 (Step S420), a normal traveling request is issued (Step S430), and the present processing is ended. The ending condition includes a condition in which a long-time-period vehicle stopping place is reached.

When the motor traveling flag Fev becomes a value of 1 while it is waited until the distance Dev to the long-time-period vehicle stopping place reaches a distance less than the distance Ddischg to the discharging starting spot, it is determined that the motor traveling flag Fev is a value of 1 in Step S370, the long-time-period vehicle stopping flag Fstop is reset to a value of 0 (Step S420), a normal traveling request is issued (Step S430), and the present processing is ended. In other words, the control of increasing the electricity storage ratio SOC of the battery 40 in order to travel the motor traveling region is prioritized. Even when the distance Dev to the long-time-period vehicle stopping place reaches a distance less than the distance Ddischg to the discharging starting spot and the control of gradually decreasing the electricity storage ratio SOC of the battery 40 is started, the following is performed when the motor traveling flag Fev becomes a value of 1 before the ending condition is met. Specifically, it is determined that the motor traveling flag Fev is a value of 1 in Step S370, the longtime-period vehicle stopping flag Fstop is reset to a value of 0 (Step S410), a normal traveling request is issued (Step S420), and the present processing is ended. The control of increasing the electricity storage ratio SOC of the battery 40 in order to travel the motor traveling region is prioritized in this case as well.

When it is determined that the motor traveling flag Fev is a value of 1 in Step S350, the long-time-period vehicle stopping flag Fstop is reset to a value of 0 (Step S420), a normal traveling request is issued (Step S430), and the present processing is ended. In other words, even when a long-time-period vehicle stopping place is present on the planned or presumed traveling route within a predetermined range from the current location, the control with respect to the long-time-period vehicle stopping place is prohibited so as not to be performed when the motor traveling flag Fev is a value of 1.

Figure 4:
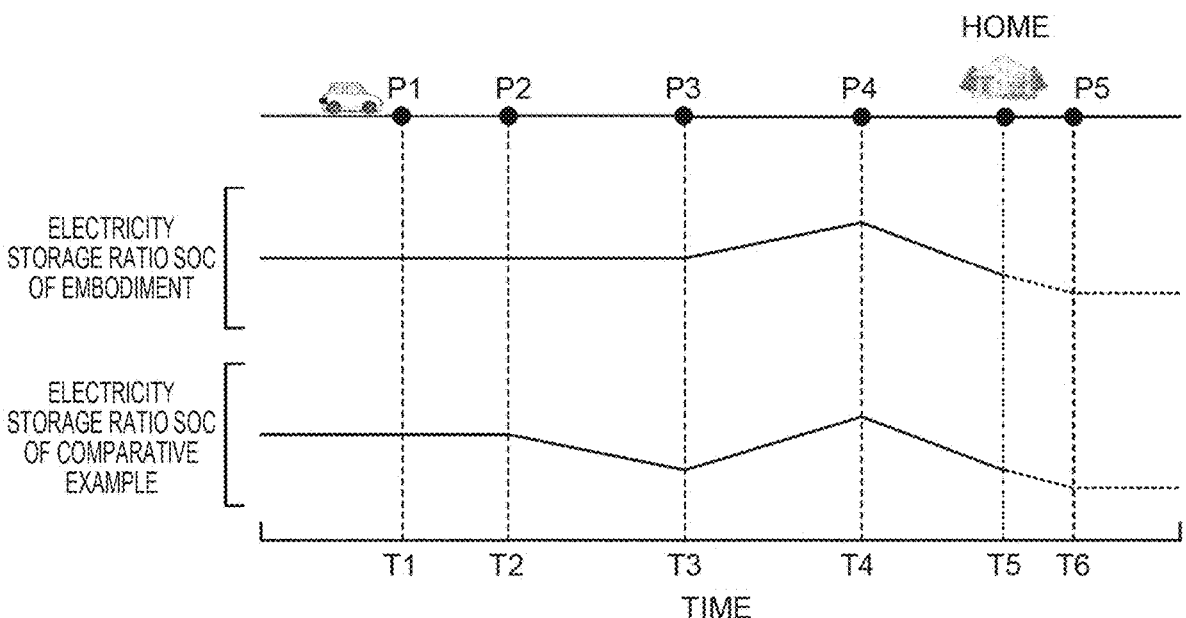
FIG. 4 is an explanatory diagram showing one example of a time variation of an electricity storage ratio SOC of a battery 40 in an embodiment and a comparative example when a place in the vicinity of home is set as a motor traveling region.

FIG. 4 is an explanatory diagram showing one example of a time variation of the electricity storage ratio SOC of the battery 40 in the embodiment and a comparative example when a place in the vicinity of home is set as the motor traveling region. A case in which the vicinity of home is set as the motor traveling region and the home is stored as a long-time-period vehicle stopping place is conceived. In the drawing, a region from a spot P4 to the home is the motor traveling region, a spot P3 is a charging starting spot before the starting spot of the motor traveling region, and a spot P2 is a discharging starting spot when the home is the long-time-period vehicle stopping place. The broken lines indicate a time variation of the electricity storage ratio SOC when the home is passed through, and a spot P5 indicates a spot at which it is determined that the home is passed through. The comparative example is a case in which the control of increasing the electricity storage ratio SOC of the battery 40 from the charging starting spot P3 before the motor traveling region and the control of decreasing the electricity storage ratio SOC of the battery 40 from the discharging starting spot P2 before the long-time-period vehicle stopping place interfere with each other. In the comparative example, the control of decreasing the electricity storage ratio SOC of the battery 40 is started from time T2 at which the vehicle reaches the discharging starting spot P2 before the long-time-period vehicle stopping place, and the electricity storage ratio SOC gradually decreases. Then, the control of increasing the electricity storage ratio SOC of the battery 40 is started from time T3 at which the vehicle reaches the charging starting spot P3 before the motor traveling region, and the electricity storage ratio SOC gradually increases. Then, when the vehicle reaches the starting spot P4 of the motor traveling region, the electricity storage ratio SOC decreases by motor traveling. Meanwhile, in the embodiment, when it is determined that home is present on the planned or presumed traveling route within a predetermined range from the current location at time T1 at which the vehicle reaches a spot P1, the motor traveling flag Fev is set to a value of 1. Therefore, the control of decreasing the electricity storage ratio SOC of the battery 40 is not performed even at the time T2 at which the vehicle reaches the discharging starting spot P2 before the long-time-period vehicle stopping place and thereafter. The control of increasing the electricity storage ratio SOC of the battery 40 is started from time T3 at which the vehicle reaches the charging starting spot P3 before the motor traveling region, and the electricity storage ratio SOC gradually increases. Then, when the vehicle reaches the starting spot P4 of the motor traveling region, the electricity storage ratio SOC decreases by motor traveling. When the home is passed through, the motor traveling is continued until time T6 at which the vehicle reaches the spot P5, and traveling is performed by normal traveling thereafter. In the embodiment, the fluctuation of the electricity storage ratio SOC of the battery 40 is small as compared to the comparative example, and hence the energy efficiency becomes satisfactory.

The prioritization of the control of increasing the electricity storage ratio SOC of the battery 40 in order to travel the motor traveling region over the control of decreasing the electricity storage ratio SOC of the battery 40 with respect to the long-time-period vehicle stopping place as above is based on the idea that motor traveling of the motor traveling region defined by a municipality, a user, and the like has a higher priority than increasement of the charging efficiency when the exhaust emission control device is warmed up after the vehicle is stopped for a long period of time.

In the hybrid electric vehicle of the embodiment described above, the control of increasing the electricity storage ratio SOC of the battery 40 before the motor traveling region is prioritized over the control of decreasing the electricity storage ratio SOC of the battery 40 before the long-time-period vehicle stopping place. As a result, the interference between the control of decreasing the electricity storage ratio SOC of the battery 40 before the long-time-period vehicle stopping place and the control of increasing the electricity storage ratio SOC of the battery 40 before the motor traveling region can be avoided. In addition, even while the control of decreasing the electricity storage ratio SOC of the battery 40 before the long-time-period vehicle stopping place is being executed, the control of decreasing the electricity storage ratio SOC of the battery 40 before the long-time-period vehicle stopping place is immediately stopped when the execution of the control of increasing the electricity storage ratio SOC of the battery 40 before the motor traveling region is predicted (when the motor traveling flag Fev is a value of 1). As a result, the control of increasing the electricity storage ratio SOC of the battery 40 before the motor traveling region can be performed in a more appropriate manner.

In the embodiment, the control of increasing the electricity storage ratio SOC of the battery 40 before the motor traveling region is prioritized over the control of decreasing the electricity storage ratio SOC of the battery 40 before the long-time-period vehicle stopping place. However, the first control and the second control may be any control as long as the second control of controlling the engine EG and the motor MG such that the electricity storage ratio SOC of the battery 40 becomes greater before the second spot region predicted or set as a spot or a region preferred to be reached in a state in which the electricity storage ratio SOC of the battery 40 is great over the first control of controlling the engine EG and the motor MG such that the electricity storage ratio SOC of the battery 40 becomes smaller before the first spot region presumed or set as a spot or a region preferred to be reached in a state in which the electricity storage ratio SOC of the battery 40 is small.

The correspondence relationship between the main components of the embodiment and the main components of the disclosure described in the column of the solution to the problem is described. In the embodiment, the engine EG is equivalent to an "engine", the motor MG is equivalent to a "motor", the battery 40 is equivalent to an "electricity storage apparatus", and the hybrid electronic control unit 50 is equivalent to a "controller".

The correspondence relationship between the main components of the embodiment and the main components of the disclosure described in the column of the solution to the problem is one example for specifically describing forms for carrying out the disclosure described in the column of the solution to the problem by the embodiment, and hence does not limit elements of the disclosure described in the solution to the problem. In other words, interpretation regarding the disclosure described in the column of the solution to the problem is to be performed on the basis of the wordings in the column, and the embodiment is merely one specific example of the disclosure described in the column of the solution to the problem.

The present disclosure has been described with use of the embodiment above, but the present disclosure is not limited to such embodiment at all and it goes without saying that the present disclosure may be carried out in various forms without departing from the gist of the present disclosure.

The present disclosure can be used in an industry of manufacturing hybrid electric vehicles and the like.

What is claimed is:
1. A hybrid electric vehicle comprising:
a global positioning system (GPS) configured to detect a current position of the hybrid electric vehicle based on signals transmitted from GPS satellites;
a navigation system including a map information database, the navigation system being configured to plan a traveling route from the current position to a destination based on the map information database;
an engine configured to output motive power for traveling;
a motor configured to output motive power for traveling;
an electricity storage apparatus configured to exchange electricity with the motor; and
a controller configured to execute at least one of a first control associated with a first region, a second control associated with a second region, or a third control, wherein
the first control causes the hybrid electric vehicle to travel by controlling the engine and the motor such that a state of charge of the electricity storage apparatus decreases before entering the first region, the first region being a region that is preferred to be reached while the state of charge is low,
the second control causes the hybrid electric vehicle to travel using only the motive power from the motor by stopping the engine in the second region set as an electrically-powered traveling region,
the third control causes the hybrid electric vehicle to travel by controlling the engine and the motor to increase the state of charge before entering the second region, and
the controller is configured to
prohibit the first control in a case where execution of the second control is scheduled within a predetermined distance range from the current position, and
refrain from performing the second control unless the execution of the second control is scheduled within the predetermined distance range.
2. The hybrid electric vehicle according to claim 1, wherein the first region is a region in which stopping for a long period of time is predicted.
3. The hybrid electric vehicle according to claim 1, wherein:
the navigation system is configured to generate load information necessary for traveling in each traveling section of the traveling route as anticipatory information based on the map information database and road
traffic information acquired from a traffic information
management center; and the controller is configured to perform at least one of the
first control, the second control, and the third control
based on the anticipatory information.

4. A control method of a hybrid electric vehicle, the hybrid
electric vehicle including a global positioning system (GPS) configured to detect a
current position of the hybrid electric vehicle based on
signals transmitted from GPS satellites, a navigation system including a map information data-
base, the navigation system being configured to plan a
traveling route from the current position to a destina-
tion based on the map information database, an engine configured to output motive power for travel-
ing, a motor configured to output motive power for traveling, an electricity storage apparatus configured to exchange
electricity with the motor, and a controller configured to execute at least one of a first
control associated with a first region, a second control associated with a second region, or a third control, the
control method comprising:

performing the first control by controlling the engine and
the motor such that a state of charge of the electricity
storage apparatus decreases before entering the first
region, the first region being a region that is preferred
to be reached while the state of charge is low;

performing the second control by traveling using only the
motive power from the motor by stopping the engine in
the second region set as an electrically-powered trav-
eling region;

performing the third control by controlling the engine and
the motor to increase the state of charge before entering
the second region;

prohibiting the first control in a case where execution of
the second control is scheduled within a predetermined
distance range from the current position; and refraining from performing the second control unless the
execution of the second control is scheduled within the
predetermined distance range.

* * * * *